United States Patent
Corsaut (10) Patent No.: US 9,434,225 B1
(45) Date of Patent: Sep. 6, 2016

(54) ILLUMINATED TRAILER HITCH COVER ASSEMBLY

(71) Applicant: Mark Anthony Corsaut, Burkburnett, TX (US)

(72) Inventor: Mark Anthony Corsaut, Burkburnett, TX (US)

(*) Notice: Subject to any disclaimer, the term of this patent is extended or adjusted under 35 U.S.C. 154(b) by 78 days.

(21) Appl. No.: 14/185,550

(22) Filed: Feb. 20, 2014

Related U.S. Application Data (60) Provisional application No. 61/768,078, filed on Feb. 22, 2013.

(51) Int. Cl.
*B60D 1/60* (2006.01)
*G09F 21/04* (2006.01)
*B60D 1/64* (2006.01)

(52) U.S. Cl.
CPC . *B60D 1/64* (2013.01); *B60D 1/60* (2013.01); *G09F 21/04* (2013.01); *G09F 21/048* (2013.01)

(58) Field of Classification Search
CPC .......... B60D 1/58; B60D 1/60; B60D 1/605; G09F 21/048; G09F 21/04
See application file for complete search history.

(56) References Cited

U.S. PATENT DOCUMENTS

| | | | |
|---|---|---|---|
| 5,593,170 A | 1/1997 | Chiu | |
| 5,603,178 A * | 2/1997 | Morrison | B60D 1/60 280/507 |
| 5,979,094 A * | 11/1999 | Brafford, Jr. | B60D 1/60 40/205 |
| 6,053,627 A * | 4/2000 | Vo | B60Q 1/305 362/485 |
| 6,199,892 B1 * | 3/2001 | Dahl | B60D 1/60 280/292 |
| 6,357,899 B1 | 3/2002 | Craven | |
| D458,195 S * | 6/2002 | Beauvais | D12/162 |
| 6,412,202 B1 * | 7/2002 | Oswood | G09F 21/04 40/204 |
| D471,137 S * | 3/2003 | Shepherd | D12/162 |
| 6,553,697 B1 * | 4/2003 | Pichan | G09F 13/04 40/205 |
| 6,655,822 B1 * | 12/2003 | Sylvester | B60Q 1/2661 362/485 |
| 6,685,347 B2 | 2/2004 | Grutze | |
| D648,661 S * | 11/2011 | Sullivan | D12/162 |
| 8,091,915 B2 * | 1/2012 | Campbell | B60D 1/60 280/507 |
| 8,752,856 B2 * | 6/2014 | Sarajian | B60D 1/605 280/507 |
| 8,789,300 B2 * | 7/2014 | Rowley | B60D 1/58 40/591 |
| 2005/0286257 A1 * | 12/2005 | Trimmer | B60Q 1/50 362/485 |
| 2006/0209549 A1 * | 9/2006 | Valdez | B60D 1/60 362/485 |
| 2006/0265918 A1 * | 11/2006 | Meyer | G09F 21/04 40/411 |
| 2011/0167688 A1 * | 7/2011 | Frost | G09F 21/04 40/541 |
| 2011/0204595 A1 * | 8/2011 | Fox | B60D 1/60 280/507 |
| 2012/0167421 A1 * | 7/2012 | Rowley | B60D 1/58 40/427 |
| 2012/0320620 A1 * | 12/2012 | Bosarge | B60Q 1/2661 362/546 |

* cited by examiner

*Primary Examiner* — Paul N Dickson
*Assistant Examiner* — Marc A Scharich
(74) *Attorney, Agent, or Firm* — McAfee & Taft (57) ABSTRACT

An illuminated trailer hitch cover assembly that is removably attached to a hitch receiver of a vehicle. The illuminated trailer hitch cover assembly is configured to display one or more illuminated indicia when the vehicle's taillights or brake lights are activated. At least one indicia is projected onto the ground surface below the illuminated trailer hitch cover assembly. The illuminated trailer hitch cover assembly is configured such that different indicia can be displayed through use of interchanging display indicia assemblies.

18 Claims, 13 Drawing Sheets

ILLUMINATED TRAILER HITCH COVER ASSEMBLY

CROSS REFERENCE TO RELATED APPLICATIONS

This application claims priority from U.S. Provisional Application Ser. No. 61/768,078 filed Feb. 22, 2013, entitled ILLUMINATED TRAILER HITCH COVER ASSEMBLY, the entirety of which is incorporated herein by reference.

BACKGROUND

Vehicle owners and operators personalize his/her vehicle with bumper stickers, window stickers, and other indicia to express his/her messages, opinions, beliefs, personality, or support for an organization, cause, or team. Vehicles equipped with hitches do not always have the drawbar or other hitch attachment connected thereto. As a result, the hitch receiver mounted on the vehicle is exposed to the elements, is not aesthetically pleasing, and does not provide the vehicle owner or operator the ability to personalize his/her vehicle and non-verbally express those beliefs to others on the road. Therefore, there is a need for an aesthetically pleasing hitch receiver cover to protect the hitch receiver from corrosion as a result of exposure to dirt, debris, and moisture, and to provide an avenue for vehicle owners and operators to express his/her messages, opinions, beliefs, personality, or support for an organization, cause, or team that is visible to others, especially during the night or when outside conditions are dark.

Current illuminated trailer hitch cover assemblies are limited to a single image, message, or other indicia that is displayed directly from the rear of the vehicle. For those individuals desiring to display multiple indicia at a time, current assemblies do not offer the ability for this form of expression. Additionally, current assemblies do not utilize the ground surface below the hitch cover assembly as a medium for displaying indicia. Therefore a need exists for an illuminated trailer hitch cover assembly that not only protects the hitch receiver but also provides the vehicle operator the ability to personalize his/her vehicle with an aesthetically pleasing indicia displaying device that is capable of displaying multiple indicia simultaneously by utilizing the ground surface below the hitch cover assembly to display indicia.

SUMMARY

The apparatus described herein is directed to an illuminated trailer hitch cover assembly that overcomes the deficiencies described above, and having other advantages, is provided.

An illuminated hitch cover assembly removably attachable to a hitch receiver of a vehicle, the hitch cover assembly comprising a housing having a first side, a second side, and a bottom opening. The first side defines a first side opening, the second side is closed, and the housing generally defines a cavity. The hitch cover assembly further includes a mounting shank integrally connected to the second side of the housing and projecting therefrom. The mounting shank is slideably received by the hitch receiver of the vehicle. A divider plate positioned within the housing cavity and dividing the housing cavity into a first chamber and a second chamber. The divider plate has a first face and a second face, and the first face of the divider plate is proximate the first side opening of the housing and the second face of the divider plate is proximate the second side of the housing. The hitch cover assembly also includes a first light source affixed to a top side of the housing within the second chamber, and a second light source positioned in the first chamber and affixed to the first face of the divider plate. Both first and second light sources are configured to emit visible light upon activation of brake lights or upon illumination of taillights of the vehicle. An electrical plug operably connected to the first and second light sources and wherein the electrical plug is configured to operably connect with a wiring harness connector of the vehicle thereby providing electrical power to the first and second light sources.

The hitch cover assembly further includes a lens display assembly including a first surface having a first indicia thereon and a second surface having a second indicia thereon. The lens display assembly is removably secured to the second side of the housing, wherein the first surface covers the first side opening of the housing, wherein the second surface covers the bottom opening of the housing. Illumination of the second light source illuminates the first indicia and illumination of the first light source projects a visible image of the second indicia onto a surface below the hitch cover assembly.

In another embodiment, an illuminated hitch cover assembly removably attachable to a hitch receiver of a vehicle, the hitch cover assembly comprises a housing having a first side, a second side, and a bottom opening, wherein the first side defines a first side opening and the second side is closed, and the housing generally defines a cavity. A mounting shank integrally connected to the second side of the housing and projecting therefrom, wherein the mounting shank is received by the hitch receiver of the vehicle. A light source affixed to a top side of the housing within the cavity. The hitch cover assembly further includes a lens display assembly having a first surface and a second surface, wherein either the first surface or the second surface includes an indicia thereon, and wherein upon illumination of the light source the indicia is illuminated.

DETAILED DESCRIPTION

The illuminated trailer hitch cover assembly is removably attached to a vehicle's existing frame mounted receiver hitch when the vehicle is not towing or otherwise using the receiver hitch with a hitch mounted accessory, such as a bike rack, golf bag rack, etc.

In North America, the Society of Automotive Engineers (SAE) currently defines classes of trailer hitches into Class I, II, III, IV under SAE Standard J684. Common sizes of frame mounted receiver hitches include a 2 inch by 2 inch receiver opening commonly used for Class III and Class IV hitches; a 1.25 inch by 1.25 inch receiver opening commonly used in Class I and Class II hitches. Another hitch receiver opening size includes and a 2.5 inch by 2.5 inch hitch. The above hitch receiver openings are generally square shaped. The illuminated trailer hitch cover assembly described herein is adaptable to fit within any of the above hitch receiver opening sizes. Preferably, the illuminated trailer hitch cover assembly is configured to fit within a 2 inch by 2 inch hitch receiver.

The illuminated trailer hitch cover assembly 4 includes removable lens display assembly 18 that has a downward facing second surface 24 having second indicia 26 thereon that projects a visible image 28 of second indicia 26 on the ground surface below illuminated trailer hitch cover assembly 4. Additionally, lens display assembly 18 includes a rearward facing (i.e. facing outward and away from the vehicle) first surface 20, which may have a first indicia 22 thereon. First indicia 22 is illuminated when a light source 36 within illuminated trailer hitch cover assembly 4 is illuminated. FIGS. 1-5, depict various views of illuminated trailer hitch cover assembly 4.

Illuminated trailer hitch cover assembly 4 includes housing 6, as shown in FIGS. 1-4. Referring to FIGS. 2, 3, 4, and 10, housing 6 has a first side 8, a second side 10, a first side opening 46 defined by first side 8, and a bottom opening 48. Bottom opening 48 is generally square shaped, however, other geometric shapes are possible. Second side 10 is a generally solid and opaque material, in other words, second side 10 is generally closed. As shown in the figures, housing 6 is depicted as an arcuate shape. Other geometric shapes, such as a square, rectangle, diamond, pentagon, hexagon, octagon, sphere, etc., for housing 6 are also suitable.

Figure 2:
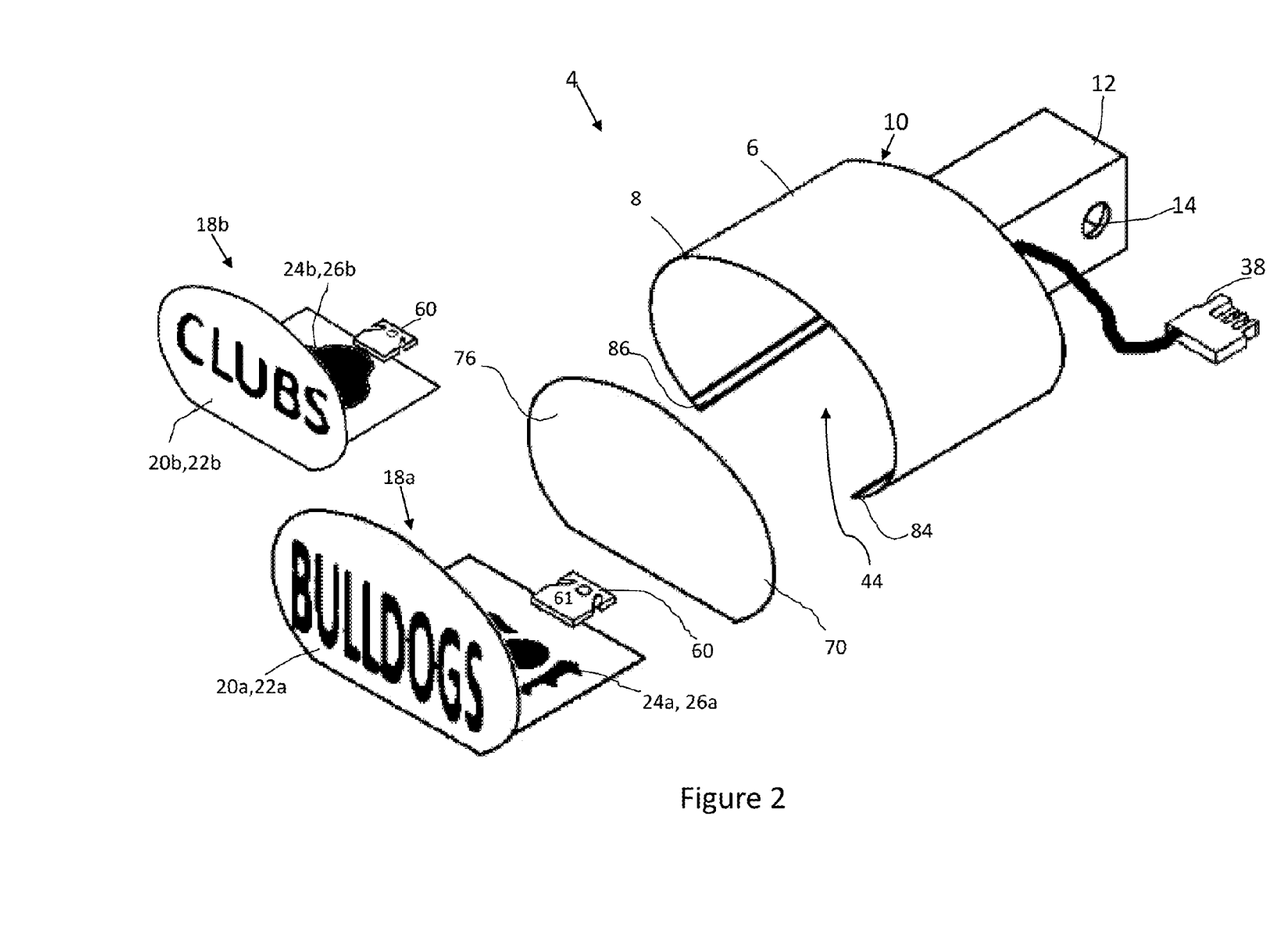
FIG. 2 is an exploded perspective view of an embodiment of the illuminated trailer hitch cover assembly.
Figure 3:
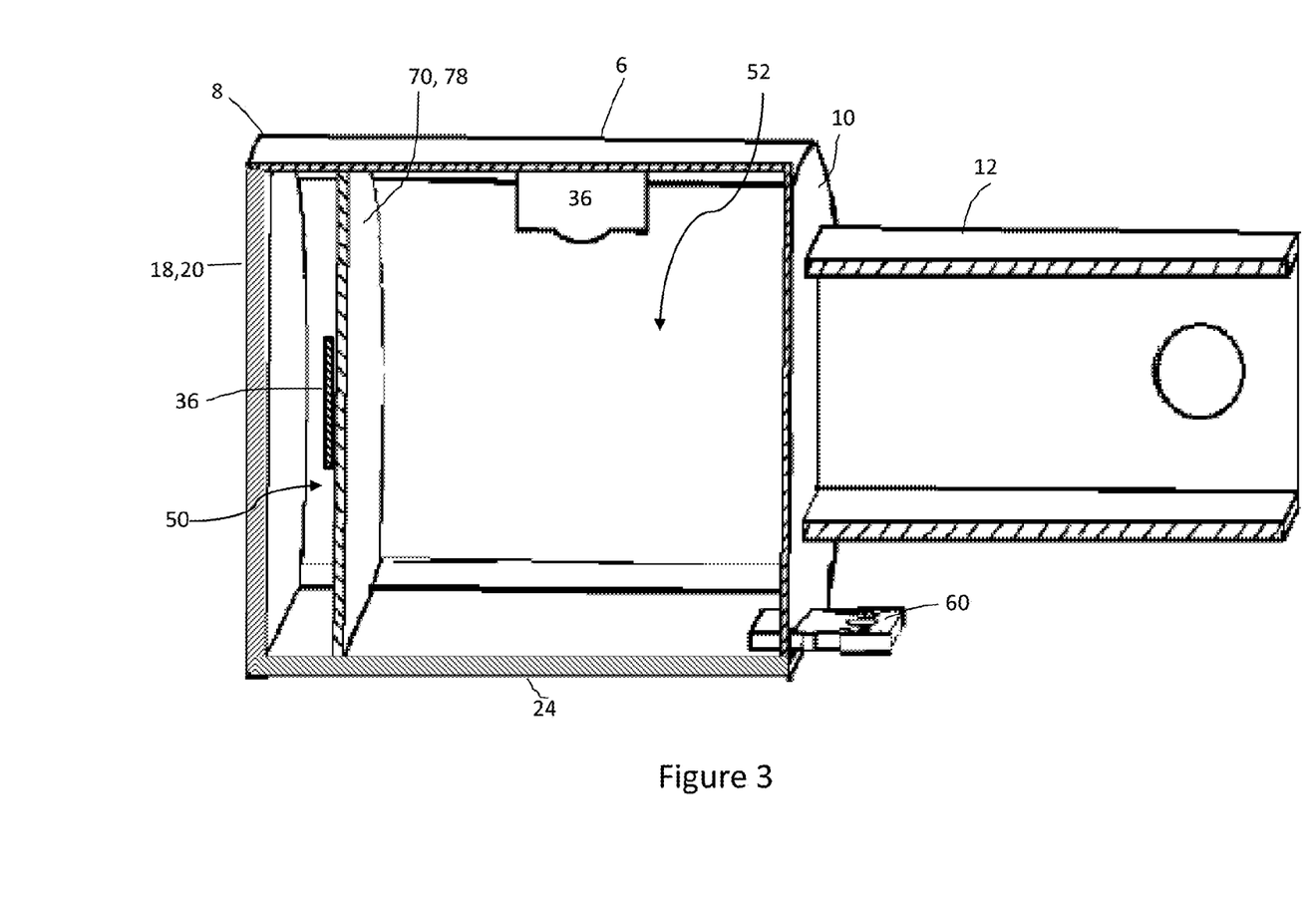
FIG. 3 is a cross-sectional view of the illuminated trailer hitch cover assembly.
Figure 4:
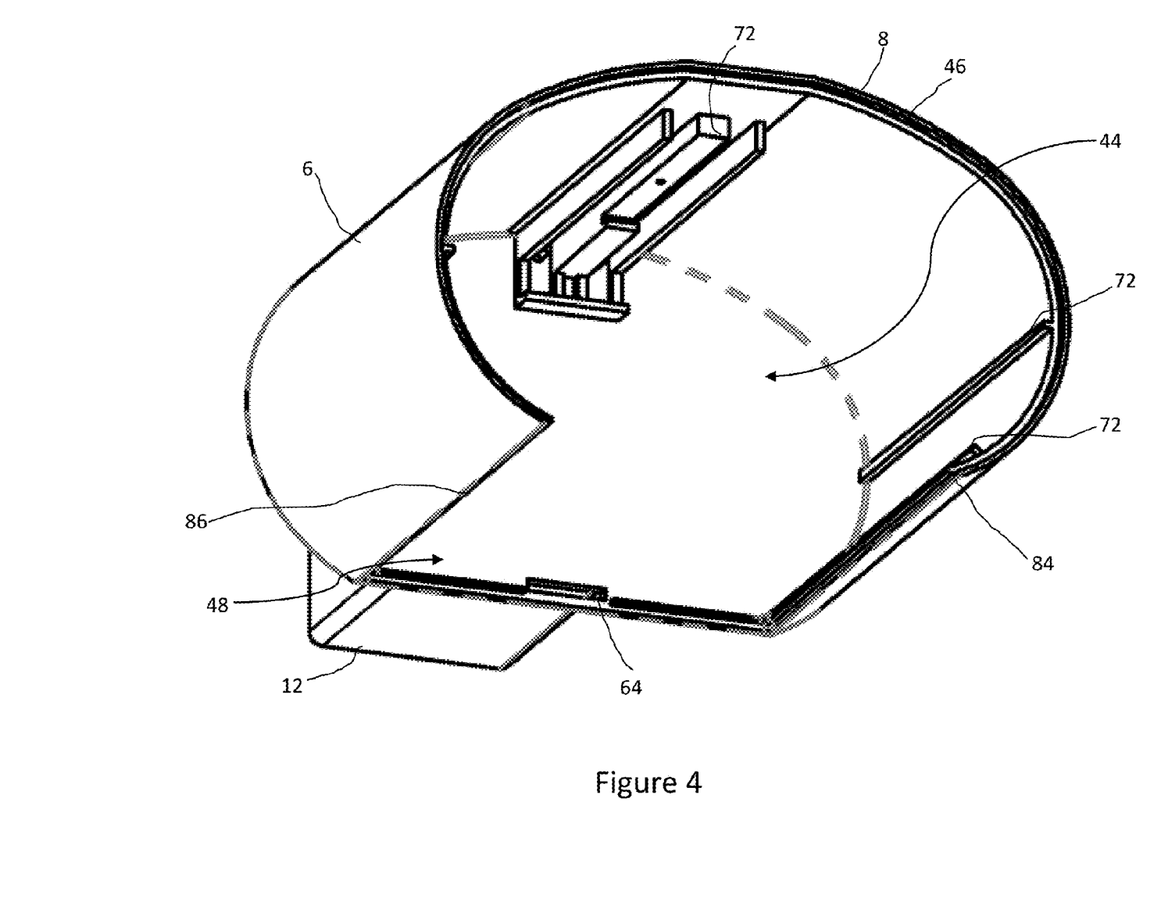
FIG. 4 is a perspective view of an embodiment of the housing of the illuminated trailer hitch cover assembly.

As depicted in FIGS. 2, 3, and 4, housing 6 generally defines cavity 44. When lens display assembly 18 is removeably secured to housing 6, cavity 44 is enclosed. Housing 6 may be made of metal, such as carbon, steel, or aluminum; or thermoplastic polymers, such as polycarbonate, polyethylene and polyvinyl chloride materials, or any other suitable material, and combinations thereof. In one embodiment, housing 6 is formed of thermoplastic polymers. Housing 6 may be formed by manufacturing processes such as injection molding such as through an extrusion molding process, injection plastic molding, or other fabrication methods and techniques.

Figure 10:
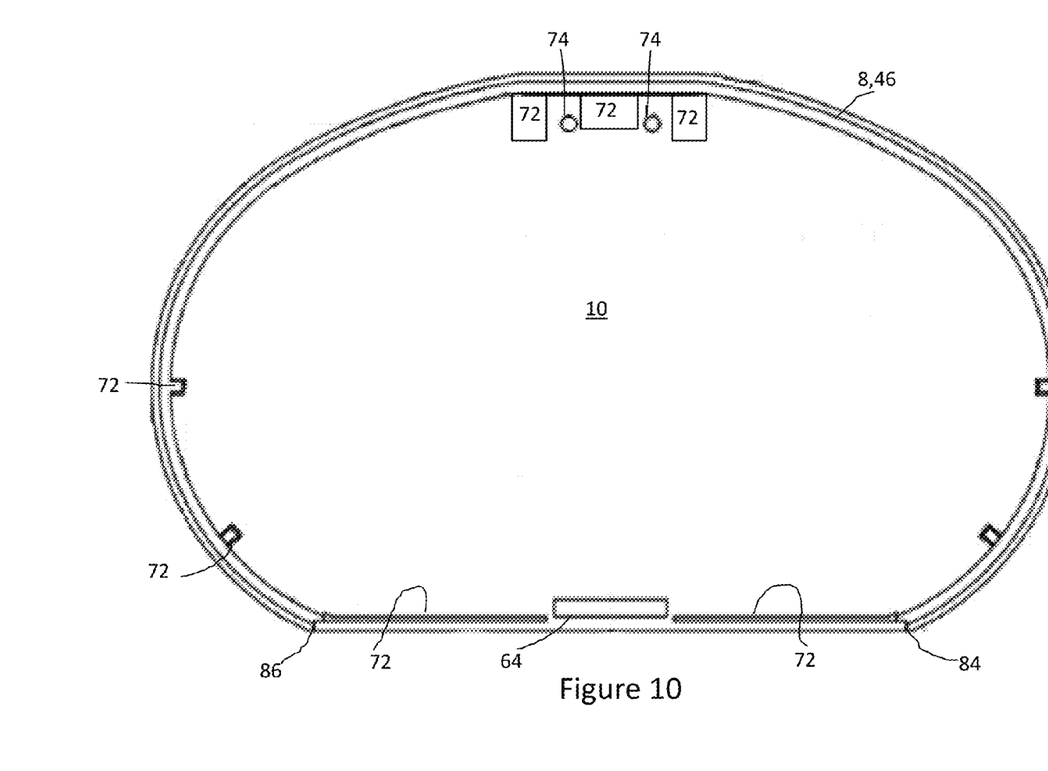
FIG. 10 is a view of the front the illuminated trailer hitch cover assembly with the lens display assembly removed.
Figure 11:
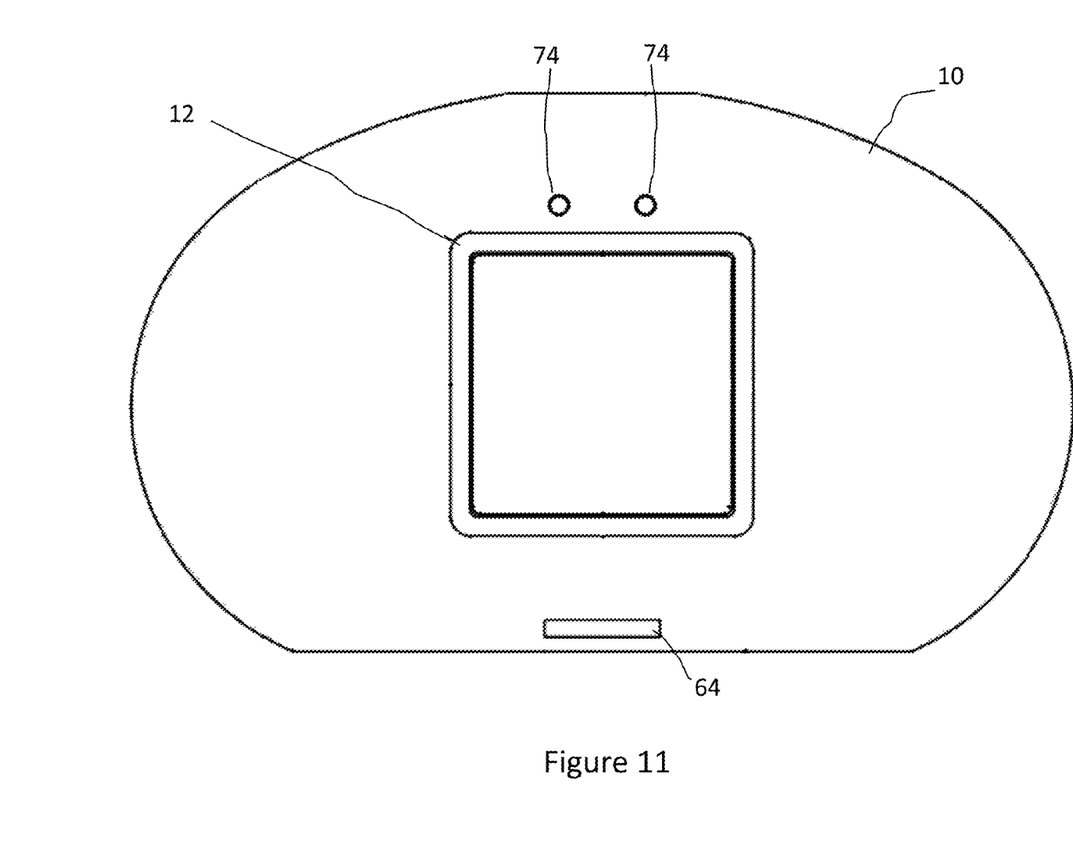
FIG. 11 is a view of the back of the illuminated trailer hitch cover assembly with the lens display assembly removed.

FIGS. 2 and 3 depict one embodiment of housing 6 without ribs 72 and FIGS. 4 and 10 depict another embodiment of housing 6. As shown in FIGS. 4 and 10, ribs 72 are integrally formed on the interior surface of housing 6. The three ribs 72 at the top of the interior portion of housing 6 as shown in FIGS. 4 and 10 provide a surface to affix light source 36, as depicted in FIG. 3, these three ribs 72 also serve as stopper ribs, which will be discussed below. Referring to FIG. 10, ribs 72 on second side 10 and proximate bottom opening 48 help prevent light leakage at the union of housing 6 and lens display assembly 18 as well as prevent environmental debris from entering housing 6. Ribs 72 on the side of housing 6 will be discussed in detail later. Referring to FIG. 10, housing 6 also includes slot 64 on second side 10. Slot 64 defines a passageway therethrough and is used for removably securing lens display assembly 18 to housing 6. As shown in FIGS. 10 and 11, housing 6 includes one or more holes 74, to allow for electrical wiring connection of electrical plug 38 to light source 36 within housing 6.

Bottom opening 48 is generally defined by a first bottom edge 84, a second bottom edge 86, and the bottom edge of second side 10, as shown in FIGS. 2, 4, and 10. Bottom opening 48 has a geometric configuration corresponding to a geometric configuration of the second surface 24 of lens display assembly 18 as shown in FIGS. 3, 4, and 9.

Figure 6:
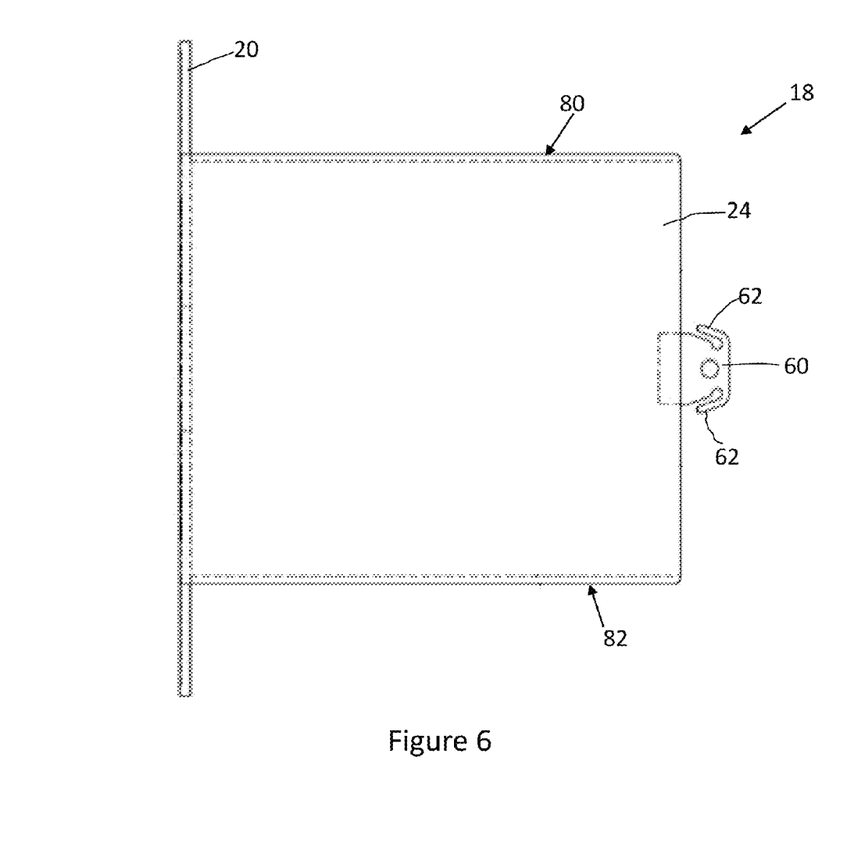
FIG. 6 depicts a bottom view of the lens display assembly of the illuminated trailer hitch cover assembly.
Figure 7:
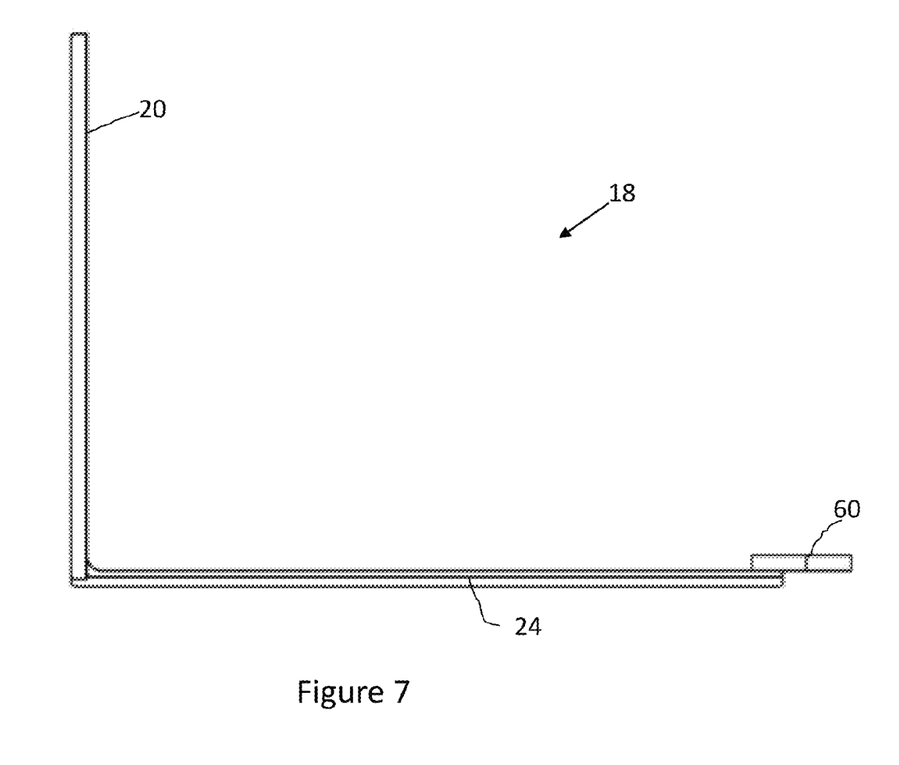
FIG. 7 depicts a side view of the lens display assembly.
Figure 8:
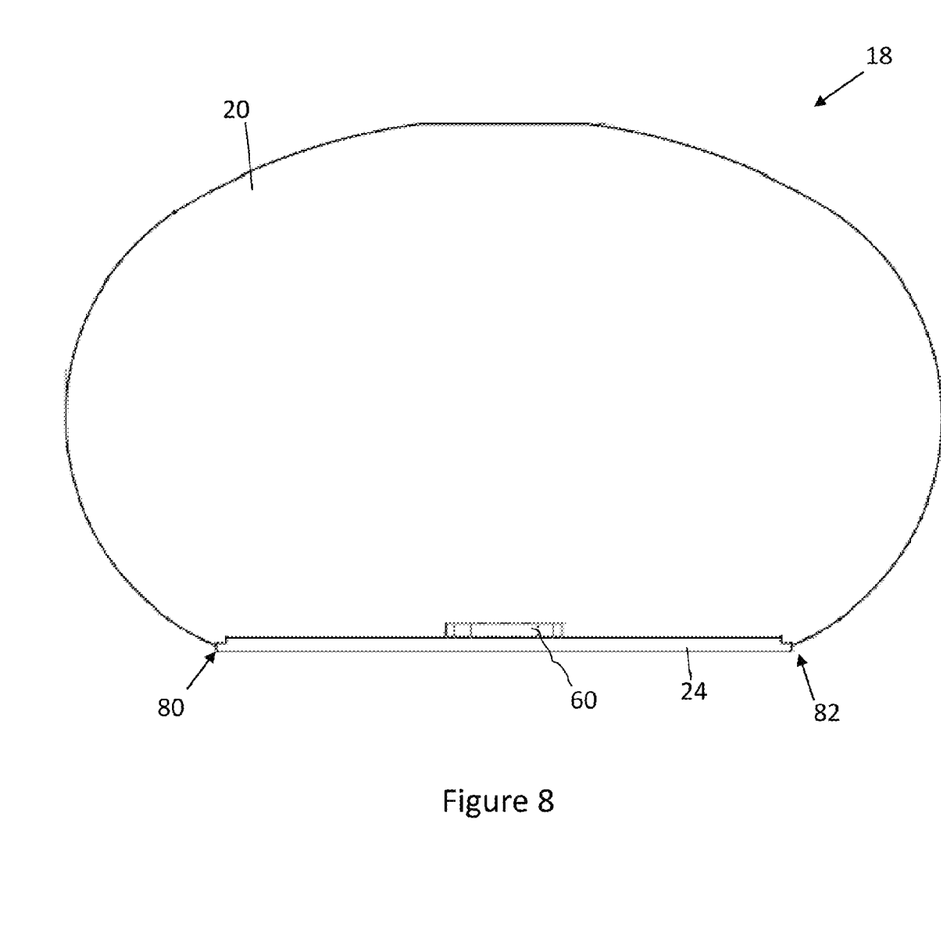
FIG. 8 depicts a back view of the lens display assembly.
Figure 9:
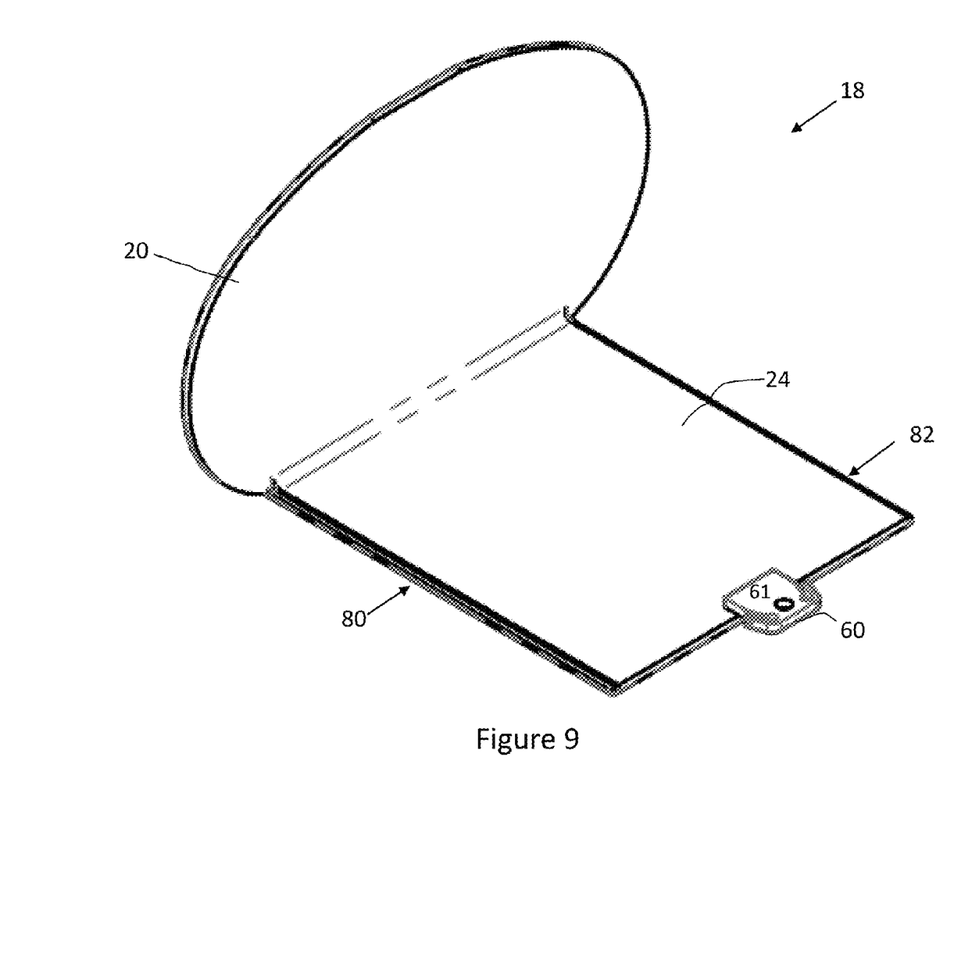
FIG. 9 is a back perspective view of the lens display assembly.

With reference to FIGS. 6, 8, and 9, second surface 24 of lens display assembly 18 includes a first edge 80 and second edge 82. In the figures, first and second edges 80 and 82 are generally step-shaped. First and second bottom edges 84 and 86, respectively, allow for slideably mating with first edge 80 and second edge 82 of second surface 24, in a manner such that second surface 24 and housing 6 cover bottom opening 48 and enclose cavity 44 such that a generally smooth planar surface is made. As shown in the figures, first bottom edge 84 and second bottom edge 86 are in the shape of a shoulder; in other embodiments, the configuration of first bottom edge 84, second bottom edge 86, first edge 80, and second edge 82 may be generally beveled, generally chamfered, or any other configuration that provides a mating surface for engagement and enclosure of cavity 44.

Figure 1:
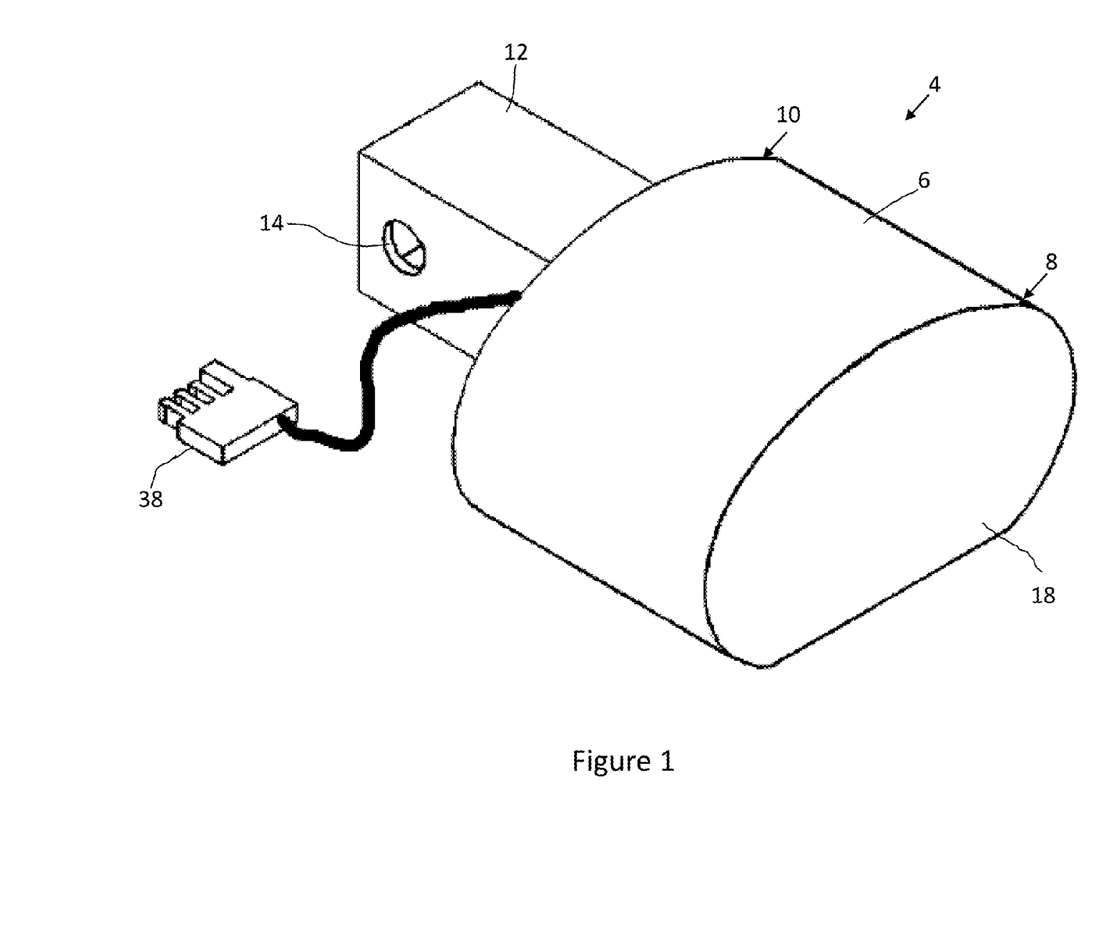
FIG. 1 depicts a perspective view of one embodiment of the illuminated trailer hitch cover assembly.

The periphery of lens display 18 complements the periphery of housing 6 as depicted in FIGS. 1 and 2. For example, as shown in FIGS. 1 and 2, first surface 20 is arcuate and covers first side opening 46 and second surface 24 is square or rectangular and covers bottom opening 48. As a result, the securing together of housing 6 and lens display assembly 18 provide total enclosure of cavity 44. Stated another way, first side opening 46 has a geometric configuration corresponding to the geometric configuration of first surface 20. In the depicted embodiment, first side 8 includes a shoulder such that upon securing of lens display assembly 18 to housing 6, first surface 20 is flush with housing 6 as shown in FIGS. 1 and 3.

Illuminated trailer hitch cover assembly 4 includes divider plate 70 as shown in FIGS. 2, 3, 12, and 13. In alternative embodiments, hitch cover assembly 4 does not include divider plate 70. Divider plate 70 has a geometric configuration corresponding to the geometric configuration of first side opening 46 of housing. Divider plate 70 is positioned to fit snugly and securely within housing cavity 44. Divider plate 70 also provides structural support to housing 6. As depicted in FIG. 3, divider plate 70 is positioned within housing cavity 44 and divides housing cavity 44 into a first chamber 50 and a second chamber 52. First chamber 50 and second chamber 52 are light isolating chambers, meaning, for example, that light from light source 36 within each chamber does not interfere with the other. One result is that a different colored light source in each chamber may be used.

Divider plate 70 includes a first face 76 which is proximate to first side opening 8 as shown in FIG. 3. Divider plate 70 also includes a second face 78 which is proximate to second side 10. As shown in FIG. 3, a first light source 36 is affixed to a top side of housing 6 within second chamber 52 and is configured to emit visible light upon activation of brake lights or upon illumination of taillights of vehicle 2. Illumination of first light source 36 projects a visible image 28 of second indicia 26 onto a surface below hitch cover assembly 4. To achieve a crisp or sharp image projection 28 onto the surface below hitch cover assembly 4, it is desirable to position first light source 36 in general alignment with the center of second indicia 26.

Figure 12:
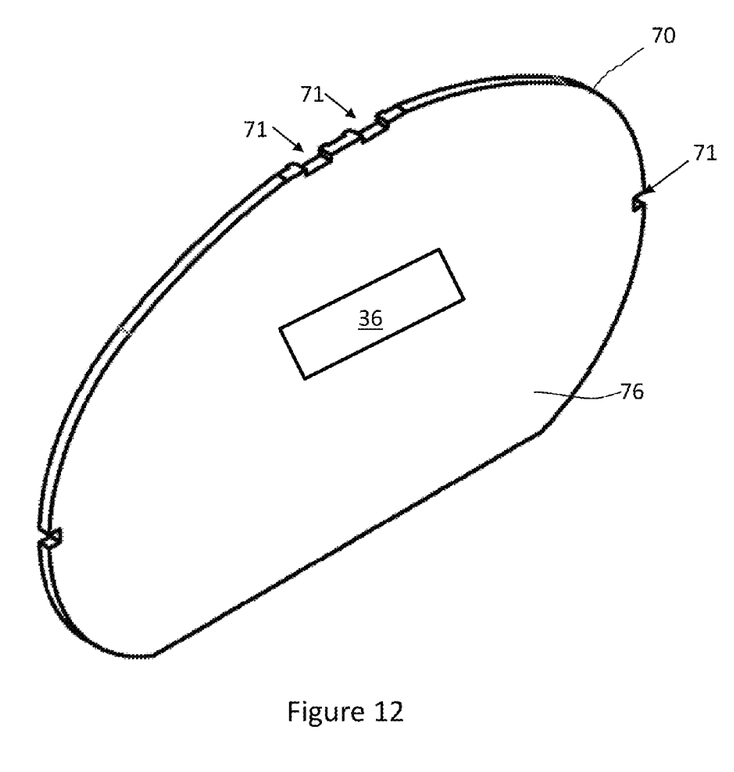
FIG. 12 is a perspective view of an embodiment of the divider plate.
Figure 13:
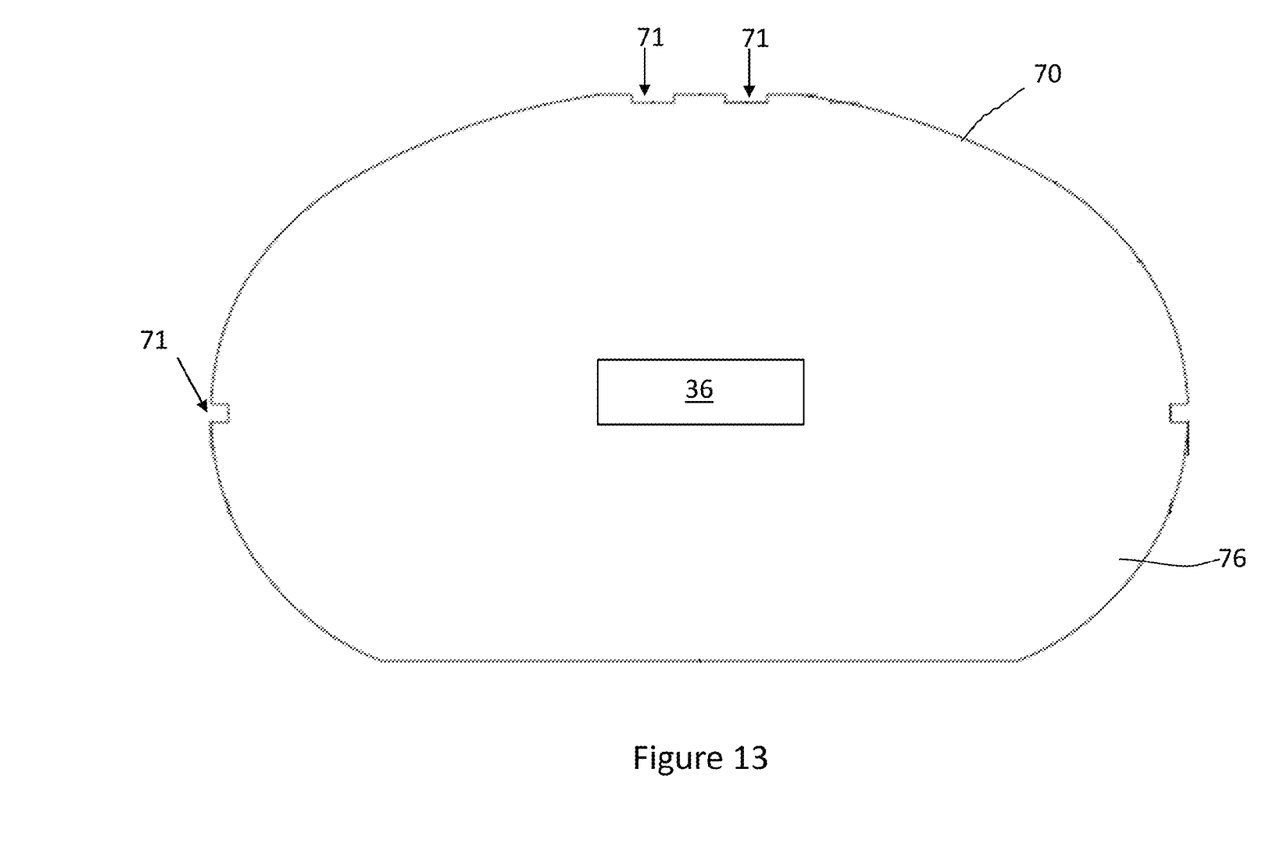
FIG. 13 depicts an embodiment of the periphery of the divider plate.

Still referring to FIG. 3, second light source 36 is positioned in first chamber 50 and affixed to first face 76 of divider plate 70. Second light source 36 is configured to emit visible light upon activation of brake lights or upon illumination of taillights of vehicle 2. Preferably, second light source 36 is positioned on divider plate 70 as shown in FIGS. 12 and 13 to be generally aligned with the center of first indicia 22. Illumination of second light source 36 illuminates first indicia 22. While preferred placement of first and second light sources 36 are disclosed, the location of light sources 36 can be varied so long as illumination of first indicia 22 and second indicia 26 as described herein is achieved.

With reference to FIGS. 4, 10, 12, and 13, ribs 72 are integrally formed on housing 6 to assist with positioning and alignment of divider plate 70 therein. For example, divider plate 70 includes indentations 71 along its periphery. Indentations 71 on the sides of divider plate 70 correspond to ribs 71 along the centerline of the sides of housing 6. These corresponding ribs 72 act to guide and position divider plate 70 snugly and securely within housing 6. With reference to FIGS. 4 and 10, the ribs 72 along the side of housing 6 and proximate to bottom opening 48 do not run the entire length of housing 6, rather these ribs 72 serve as stoppers to prevent divider plate 70 from being place further back within cavity 44. Similarly, ribs 72 along the top of housing 6 also serve as stopper ribs. To prevent unwanted movement of divider plate 70 within cavity 44, divider plate 70 may be secured via fasteners, such as screws, bolts, pins, and other suitable fastening mechanisms, to one or more of the stopper ribs 72.

As depicted in FIGS. 1-4, and 11, mounting shank 12 is affixed to second side 10 of housing 6 and projects therefrom. Affixing mounting shank 12 to housing 6 is achieved by injection mold process, welding, or securing mounting shank 12 with fasteners, such as screws, bolts, pins, and other suitable fastening mechanisms. Mounting shank 12 is configured to be slideably positioned within the opening of a frame mounted receiver hitch (not depicted) of vehicle 2 thereby achieving removable attachment between illuminated trailer hitch cover assembly 4 and the receiver hitch of vehicle 2.

Connecting illuminated trailer hitch cover assembly 4 to the hitch receiver is similar to connecting the drawbar of a hitch towing accessory to the hitch receiver. Pin holes 14 of mounting shank 12 are aligned with the pin holes of the hitch receiver and secured together by sliding and securing a hitch pin (not depicted) therethrough.

Figure 5:
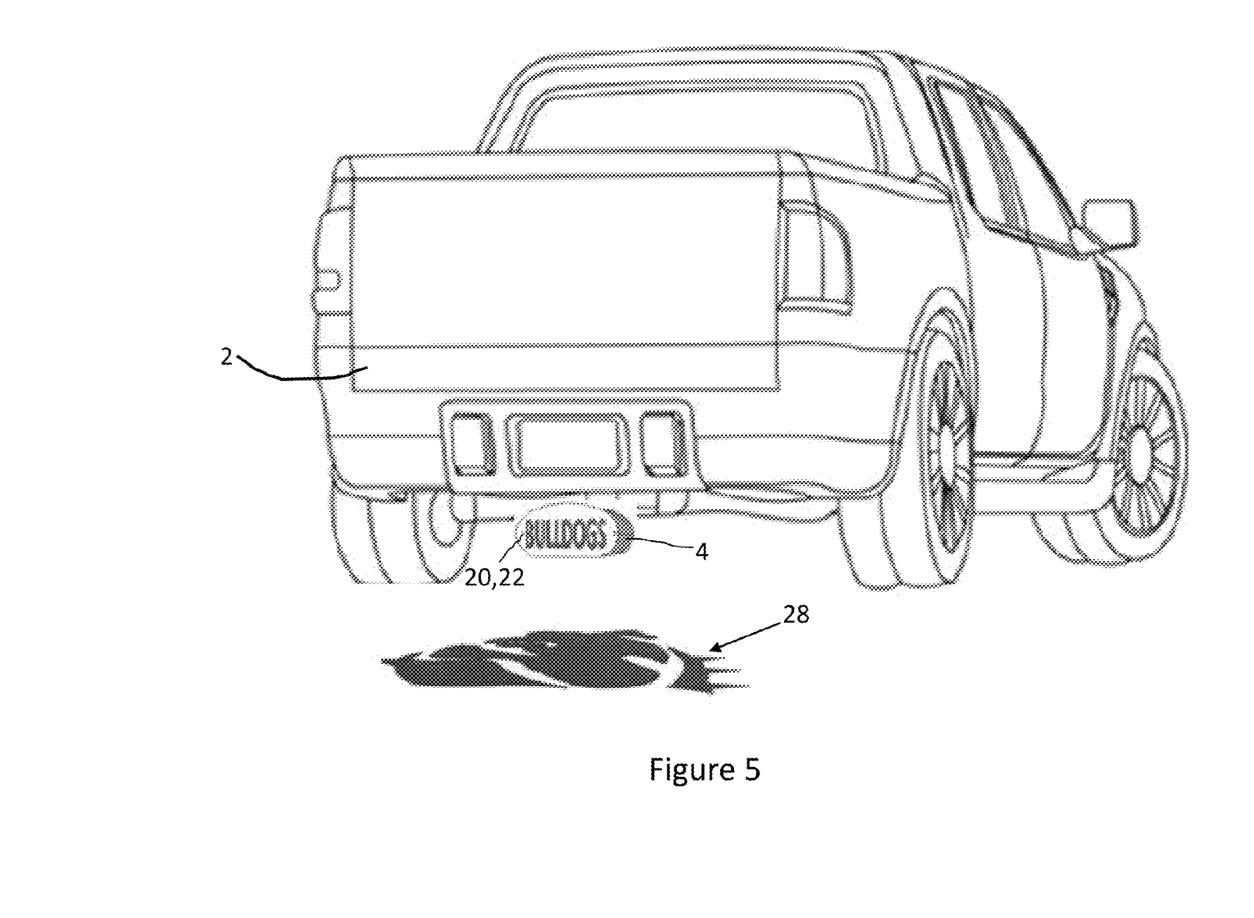
FIG. 5 depicts the illuminated trailer hitch cover assembly on a vehicle and illumination of indicia behind the assembly and projecting indicia on the surface below the assembly.

Illuminated trailer hitch cover assembly 4 also includes light source 36. In embodiments without divider plate 70, light source 36 is affixed to the top side of housing 6 within cavity 44 as shown in FIG. 3 and illuminates both first indicia 22 and second indicia 26. It should be appreciated that light source 36 may be affixed to any surface within cavity 44 such that illumination of both first indicia 22 and second indicia 26 is achieved. In embodiments with divider plate 70, as previously discussed, second light source 36 illuminates first indicia 22 and first light source 36 illuminates second indicia 26. FIG. 5 depicts the operation of illuminated trailer hitch cover assembly 4 mounted on a vehicle. As shown in FIG. 5, first indicia 22 is formed of the word "BULLDOGS" which is illuminated. Simultaneously, a visible image 28 of second indicia 26 (e.g. the head of a bulldog) is projected on the surface below hitch cover assembly 4. When divider plate 70 is present, illumination of first light source 36 illuminates second indicia 26, and illumination of second light source 36 illuminates first indicia 22.

Light source 36 is operably coupled to electrical plug 38 through holes 74. Electrical plug 38 is operably connected to the existing wiring harness of vehicle 2 thereby providing electricity from the electrical system of vehicle 2 to light source 36. For embodiments with divider plate 70, divider plate 70 may include indentions 71 along the top surface as depicted in FIGS. 12 and 13 to allow for electrical wiring to enter into first chamber 50 and couple with first light source 36. The voltage supplied to light source 36 is approximately 12 volts. Light source 36 is one or more lighting elements, such as light bulbs, including, without limitation, omnidirectional light bulbs, directional light bulbs, or light emitting diodes (LEDs). Light source 36 can be colored, multi-colored, or clear.

Light source 36 illuminates visible light into cavity 44 when vehicle 2 brakes (i.e. when the brake pedal of vehicle 2 is engaged) or when the rear position lights (i.e. taillights) of vehicle 2 are operating.

Lens display assembly 18 is shown in FIGS. 2, 3, and 6-9. Lens display assembly 18 includes a first surface 20 having first indicia 22 thereon and a second surface 24 having second indicia 26 thereon. Lens display assembly also includes securing mechanism 60, which in the depicted embodiment is latch 60. As shown in FIGS. 2, 3, 6, 7, and 9, latch 60 is positioned on top of second surface 24 distal from first surface 20 and extends beyond second surface 24 in the same direction as second surface 24.

Referring to FIGS. 2, 6, and 9, latch 60 includes latch body 61 and flexible arm members 61 extending therefrom. Latch 60 enables the removable attachment and securing of lens display assembly 18 and housing 6. Operation of latch 60 is similar to a dual slide buckle. To secure lens display assembly to housing 6, latch 60 will pass through the passageway defined by slot 64 in second side 10. As latch 60 passes through slot 64, arm members 62 will be compressed and flex inward toward latch body 61. After arm members 62 are completely through slot 64, arm members 61 will expand outward from latch body 61 and beyond the opening defined by slot 64 thereby securing lens display assembly 18 to housing 6. As a result, any sliding of lens display assembly or attempt pull lens display assembly will cause the expanded arm members 62 to engage with an exterior surface of second side 10 and prevent lens display assembly 18 from being separated from housing 6.

In order to remove lens display assembly 18, a user will exert inward pressure on arm members 62 such that arm members 62 are compressed and flex inward toward latch body 61 causing arm members 62 to be generally in alignment with the passageway defined by slot 64. At the same time, the user will also pull lens display assembly 18 away from housing 6 in the opposite direction utilized to secure lens display assembly 18 thereby slideably removing lens display assembly 18 from housing 6. It should be appreciated that other securing mechanisms 60 to secure housing 6 and lens display assembly 18 are also suitable. The figures depict a securing mechanism 60 having two arms 61, it should be appreciated that a single arm 62 or other configuration are suitable.

In embodiments having dividing plate 70, as lens assembly 18 is brought into slideable engagement with housing 6, latch 60 will slides beneath divider plate 70 and avoid contact therewith.

Lens display assembly 18 is generally opaque except for the indicia thereon, which is generally translucent and/or transparent. Lens display assembly 18 is made of aluminum, stainless steel, or thermoplastic polymer material, such as polycarbonate, polyethylene or polyvinyl chloride, and combinations thereof. In one embodiment, lens display assembly 18 is made of thermoplastic polymer. Lens display assembly 18 can be multiple pieces that are permanently or temporarily coupled together via adhesive, weld, or mechanically connected via fasteners, such as screws, pins, dowels, or any device suitable for securing multiple objects together. Alternatively lens display assembly 18 can be manufactured as one piece via an injection mold process or fabrication. In the figures, lens display assembly 18 is shown as a single integral assembly. As shown, first surface 20 and second surface 24 are generally orthogonal to each other.

Lens display assembly 18 is removably attached to housing 6 such that varying indicias can be displayed. FIG. 2 shows an exploded perspective view of illuminated trailer hitch cover assembly 4 and alternative lens display assemblies 18a and 18b.

First and second indicia 22, 26, respectively, can be the same or different. In addition, indicia on the first surface 20 can be blank (i.e. no indicia) as shown in FIG. 1, and only indicia on second surface 24 is provided. In another embodiment, indicia on the second surface 26 can be blank (i.e. no indicia) and first surface 20 bears indicia thereon. First and second indicia can include a design, a drawing, an image, a hieroglyphic, a message or other visual indicia, and combinations thereof. First and second indicia 22, 26, respectively, applied to first and second surfaces 20 and 24, respectively, via screen printing, or can be punched or cut out of first and second surfaces 20, 24, respectively, or can be molded during the fabrication process of first and second surfaces 20, 24.

In yet another embodiment, first and second indicia 22 and 26 are made of a generally transparent and/or a generally translucent material such as vinyl film, polyethylene, or polyvinyl chloride, and are placed on first and second surfaces 20 and 24, respectively. The perimeter of first and second indicia 22, 26, respectively is defined by the opaque portions that are on first and second surfaces 20, 24, respectively. The transparent or translucent material can be monochromatic, multi-chromatic, clear, and combinations thereof. The transparent and/or translucent material is affixed to first and second surfaces respectively by adhesive, such as glue, tape, or self adhering materials; or fasteners, such as snap-fit fasteners, nails, pins, dowels, screws; or anything capable of achieving coupling of two objects is suitable.

In another embodiment, lens display assembly is generally transparent or translucent. Lens display assembly 18 may be clear, mono-chromatic, multi-chromatic or combinations thereof. First and second indicia 22 and 26 may be affixed to first and second surfaces 20 and 24, respectively, and the perimeter of the first and second indicia 22 and 26 are defined by the opaque portions surrounding the indicia.

As has been described herein, illuminated trailer hitch cover assembly 4 not only provides a vehicle owner the ability to personalize his/her vehicle but also allows the vehicle owner to nonverbally express his/her personality, opinion, or support for a cause, a team, and organization. Illuminated trailer hitch cover assembly 4 also protects the unused hitch receiver when the vehicle is not towing any items or otherwise not utilizing hitch receiver. Illuminated trailer hitch cover assembly 4 further covers the aesthetically displeasing void of the hitch receiver.

Other embodiments of the described illuminated trailer hitch cover assembly will be apparent to one skilled in the art. As such, the foregoing description merely enables and describes the general uses and methods of the foregoing described apparatus. Accordingly, the following claims define the true scope of the present invention.

What is claimed is:

1. An illuminated hitch cover assembly removably attachable to a hitch receiver of a vehicle, the hitch cover assembly comprising:

a housing having a first side, a second side, and a bottom opening, wherein the first side defines a first side opening and the second side is closed, and the housing generally defines a cavity;

a mounting shank integrally connected to the second side of the housing and projecting therefrom, wherein the mounting shank is slideably received by the hitch receiver of the vehicle;

a divider plate positioned within the housing cavity and dividing the housing cavity into a first chamber and a second chamber, the divider plate having a first face and a second face, and wherein the first face of the divider plate is proximate the first side opening of the housing and the second face of the divider plate is proximate the second side of the housing;

a first light source affixed to a top side of the housing within the second chamber, the first light source configured to emit visible light upon activation of brake lights or upon illumination of taillights of the vehicle;

a second light source positioned in the first chamber and affixed to the first face of the divider plate, the second light source configured to emit visible light upon activation of brake lights or upon illumination of taillights of the vehicle;

an electrical plug operably connected to the first and second light sources and wherein the electrical plug is configured to operably connect with a wiring harness connector of the vehicle thereby providing electrical power to the first and second light sources; and a lens display assembly including a first surface having a first indicia thereon and a second surface having a second indicia thereon, the lens display assembly is removably secured to the second side of the housing, wherein the first surface covers the first side opening of the housing, wherein the second surface covers the bottom opening of the housing, and wherein illumination of the second light source illuminates the first indicia and illumination of the first light source projects a visible image of the second indicia onto a surface below the hitch cover assembly.

2. The hitch cover assembly of claim 1, wherein the divider plate has a geometric configuration corresponding to a geometric configuration of the first side opening of the housing.

3. The hitch cover assembly of claim 1, wherein the second surface of the lens display assembly includes a first edge and a second edge, and wherein the bottom opening of the housing is defined by a first bottom edge, a second bottom edge, and the second side, wherein the first and second bottom edges slideably mate with the first and second edges of the lens display assembly.

4. The hitch cover assembly of claim 1, wherein the second surface of the lens display assembly includes a latch, the latch having a latch body and at least one flexible arm, and wherein the second side of housing includes a slot, the slot defining a passageway therethrough, and wherein the at least one arm extends beyond the slot and engages with an exterior surface of the second side of the housing thereby removably securing the lens display assembly to the housing.

5. The hitch cover assembly of claim 1, wherein the second surface of the lens display assembly is orthogonal to the first surface of the lens display assembly.

6. The hitch cover assembly of claim 1, wherein the first and second surfaces of the lens display assembly are integrally coupled.

7. The hitch cover assembly of claim 1, wherein the first and second surfaces are generally opaque and wherein the first and second indicia are generally transparent.

8. The hitch cover assembly of claim 1, wherein the first and second surfaces are generally opaque and wherein the first and second indicia are generally translucent.

9. An illuminated hitch cover assembly removably attached to a hitch receiver of a vehicle, the hitch cover assembly comprising:
  a housing having a first side, a second side, and a bottom opening, wherein the first side defines a first side opening and the second side is closed, and the housing generally defines a cavity;
  a mounting shank integrally connected to the second side of the housing and projecting therefrom, wherein the mounting shank is received by the hitch receiver of the vehicle;
  a light source affixed to a top side of the housing within the cavity;
  a lens display assembly including a first surface having a first indicia thereon and a second surface having a second indicia thereon, wherein the lens display assembly slideably mates with the housing and is removably secured to the second side of the housing, wherein the first surface covers the first side opening of the housing, wherein the second surface covers the bottom opening of the housing, and wherein the hitch cover assembly is configured to illuminate the first indicia and second indicia upon illumination of the light source, and wherein upon illumination of the light source, a visible image of the second indicia is projected onto a surface below the hitch cover assembly.

10. The hitch cover assembly of claim 9, further comprising:
  a divider plate positioned within the housing cavity and dividing the cavity into a first chamber and a second chamber, the divider plate having a first face and a second face, and wherein the first face of the divider plate is proximate the first side opening of the housing; and
  a second light source positioned in the first chamber and affixed to the first face of the divider plate, wherein the light source affixed to the top side of housing is positioned in the second chamber, and wherein the light sources are configured to emit visible light upon activation of brake lights or upon illumination of taillights of the vehicle.

11. The hitch cover assembly of claim 10, wherein the divider plate has a geometric configuration corresponding to a geometric configuration of the first side opening of the housing.

12. The hitch cover assembly of claim 9, further comprising an electrical plug operably connected to the first and second light sources and wherein the electrical plug is configured to operably connect with a wiring harness connector of the vehicle thereby providing electrical power to the first and second light sources.

13. The hitch cover assembly of claim 9, wherein the second surface of the lens display assembly includes a first edge and a second edge, and wherein the bottom opening of the housing is defined by a first bottom edge, a second bottom edge, and the second side, wherein the first and second bottom edges slideably mate with the first and second edges of the lens display assembly.

14. The hitch cover assembly of claim 9, wherein the second surface of the lens display assembly includes a latch, the latch having a latch body and at least one flexible arm, and wherein the second side of housing includes a slot, the slot defining a passageway therethrough, wherein the at least one arm extends beyond the slot and engages with an exterior surface of the second side of the housing thereby removably securing the lens display assembly to the housing.

15. The hitch cover assembly of claim 9, wherein the second surface of the lens display assembly is substantially orthogonal to the first surface of the lens display assembly.

16. An illuminated hitch cover assembly removably attachable to a hitch receiver of a vehicle, the hitch cover assembly comprising:
  a housing having a first side, a second side, and a bottom opening, wherein the first side defines a first side opening and the second side is closed, and the housing generally defines a cavity;
  a mounting shank integrally connected to the second side of the housing and projecting therefrom, wherein the mounting shank is received by the hitch receiver of the vehicle;
  a light source affixed to a top side of the housing within the cavity;
  a lens display assembly having a first surface and a second surface, wherein the first and second surfaces each include indicia thereon, and wherein upon illumination of the light source the indicia is illuminated;
  a divider plate positioned within the housing cavity and dividing the cavity into a first chamber and a second chamber, the divider plate having a first face and a second face, and wherein the first face of the divider plate is proximate the first side opening of the housing; and
  a second light source positioned in the first chamber and affixed to the first face of the divider plate, wherein the light source affixed to the top side of the housing is positioned in the second chamber.

17. The hitch cover assembly of claim 16, wherein upon illumination of the light source a visible image of the indicia on the second surface is projected onto a surface below the hitch cover assembly.

18. An illuminated hitch cover assembly removably attachable to a hitch receiver of a vehicle, the hitch cover assembly comprising:
  a housing having a first side, a second side, and a bottom opening, wherein the first side defines a first side opening and the second side is closed, and the housing generally defines a cavity;
  a mounting shank integrally connected to the second side of the housing and projecting therefrom, wherein the mounting shank is received by the hitch receiver of the vehicle;
  a light source affixed to a top side of the housing within the cavity;

a lens display assembly having a first surface and a second surface, wherein the second surface includes an indicia thereon, and wherein upon illumination of the light source the indicia is illuminated and a visible image of the indicia is projected onto a surface below the hitch cover assembly.

\* \* \* \* \*